(12) United States Patent
Torres

(10) Patent No.: US 9,604,747 B2
(45) Date of Patent: Mar. 28, 2017

(54) COMPARTMENTED BEVERAGE BOTTLE

(71) Applicant: Paulo Augusto Azevedo Torres, Woburn, MA (US)

(72) Inventor: Paulo Augusto Azevedo Torres, Woburn, MA (US)

( * ) Notice: Subject to any disclaimer, the term of this patent is extended or adjusted under 35 U.S.C. 154(b) by 118 days.

(21) Appl. No.: 14/529,878

(22) Filed: Oct. 31, 2014

(65) Prior Publication Data

US 2016/0122067 A1    May 5, 2016

(51) Int. Cl.
| | | |
|---|---|---|
| B65D 1/04 | (2006.01) |
| B65D 23/04 | (2006.01) |
| B65D 81/32 | (2006.01) |
| B65D 85/804 | (2006.01) |
| B65D 25/08 | (2006.01) |
| B65D 81/20 | (2006.01) |
| B65D 47/30 | (2006.01) |

(Continued)

(52) U.S. Cl.
CPC ............... *B65D 1/04* (2013.01); *B65D 23/04* (2013.01); *B65D 25/08* (2013.01); *B65D 47/30* (2013.01); *B65D 81/2053* (2013.01); *B65D 81/24* (2013.01); *B65D 81/3211* (2013.01); *B65D 85/804* (2013.01); *B65D 85/72* (2013.01); *B65D 2217/00* (2013.01); *B65D 2217/02* (2013.01); *B65D 2217/04* (2013.01); *F16K 5/04* (2013.01); *F16K 31/60* (2013.01)

(58) Field of Classification Search
CPC ...... B65D 1/04; B65D 25/08; B65D 2217/02; B65D 2217/00; B65D 23/04; B65D 81/3211

USPC ......... 220/502; 215/6, DIG. 8; 206/219, 221
See application file for complete search history.

(56) References Cited

U.S. PATENT DOCUMENTS 821,579 A * 5/1906 Austen ..................... B65D 1/04
                                                            215/6
1,223,207 A    4/1917 Scypinski
(Continued)

FOREIGN PATENT DOCUMENTS

| | | |
|---|---|---|
| BR | PI9802427-2 | 7/1998 |
| EP | 1645518 A2 | 4/2006 |
| WO | WO2012064296 A1 | 5/2012 |

*Primary Examiner* — Jeffrey Allen
*Assistant Examiner* — Jennifer Castriotta
(74) *Attorney, Agent, or Firm* — Thomas P. O'Connell; O'Connell Law Firm

(57) ABSTRACT

A compartmented bottle has a primary compartment and at least one secondary compartment. The primary compartment has an exhaust aperture and an inlet aperture, and the secondary compartment has a secondary exhaust aperture. The inlet aperture of the primary compartment and the secondary exhaust aperture of the secondary compartment are fluidically connected by an inter-compartmental conduit, and a selectively actuated inter-compartmental valve is disposed in the conduit. The valve, which could comprise a cylindrical valve, has a closed condition wherein the secondary compartment is sealed and an open condition wherein the secondary compartment is in fluidic communication with the primary compartment. A toroidal collar can bridge an annular channel between the primary and secondary compartments to establish a continuous cylindrical surface. The valve can be operated by a handle disposed at a distal end of an actuation rod that is drivingly engaged with the inter-compartmental valve.

12 Claims, 3 Drawing Sheets

(51) Int. Cl.
*B65D 81/24* (2006.01)
*F16K 31/60* (2006.01)
*F16K 5/04* (2006.01)
*B65D 85/72* (2006.01)

(56) References Cited

U.S. PATENT DOCUMENTS

| | | | |
|---|---|---|---|
| 2,695,614 A * | 11/1954 | Lockhart | B65D 25/082 |
| | | | 206/221 |
| 5,275,298 A * | 1/1994 | Holley, Jr. | A47J 43/27 |
| | | | 206/221 |
| 5,909,824 A | 6/1999 | Qian et al. | |
| 6,105,812 A | 8/2000 | Riordan | |
| 6,112,537 A | 9/2000 | Broadbent | |
| 7,150,369 B1 * | 12/2006 | Fryar | A61J 9/00 |
| | | | 215/10 |
| 7,225,938 B2 * | 6/2007 | Frisch | A61J 11/002 |
| | | | 215/11.1 |
| 7,331,478 B2 * | 2/2008 | Aljadi | A61J 9/00 |
| | | | 215/11.1 |
| 2006/0254936 A1 | 11/2006 | Corbitt et al. | |
| 2007/0221601 A1 * | 9/2007 | Eitrheim | A61J 11/002 |
| | | | 215/6 |

* cited by examiner

COMPARTMENTED BEVERAGE BOTTLE

FIELD OF THE INVENTION

The present invention relates generally to vessels for retaining comestible liquids. More particularly, disclosed herein is a vessel for retaining carbonated and other beverages to resist loss of carbonation and spoilage.

BACKGROUND OF THE INVENTION

Commercially sold beverages are typically distributed with the liquid to be consumed disposed within a unitary inner volume of a beverage container. The beverage container and the inner volume thereof are initially sealed from the environment by a primary sealing mechanism, such as a cap, a lid, or a cork. Once the primary sealing mechanism is removed, such as by twisting off the cap of a carbonated beverage container or by pulling the cork of a wine bottle, the entire contents of the beverage container are exposed to the outside environment and the generally deleterious effects thereof.

Carbonated beverages, such as soda and beer, are best enjoyed with their intended level of carbonation. The very opening of the carbonated beverage container releases a portion of the original carbonation and begins a decline in carbonation that is irreversible by typically available means. Unless the entire contents of the container are consumed substantially immediately, the contents of a vessel left open, of vessels repeatedly opened and closed, and even of vessels once opened that are attempted to be sealed inevitably undergoes a loss in carbonation and a loss in the intended original, fresh flavor. Exposure to the environment and the introduction of environmental air to the fixed, unitary inner volume of the vessel leave the remaining contents subject to a decline in quality. Carbonated beverages that have lost their carbonation are typically said to be 'flat' and are undesirable. Indeed, once flat, partially consumed carbonated beverages are often deemed so distasteful as to be unsuitable for consumption and are wasted.

Some volumes of beverage vessels, such as bottles holding twelve, sixteen, or even twenty ounces, can often be consumed in one sitting so that the progressive loss in carbonation and overall freshness has minimal impact. However, with larger containers, such as two-liter plastic bottles and similarly large containers, it is unlikely that the contents can be consumed when the bottle is first opened. As a result, the contents of such beverage containers are often discarded, or the consumer is subjected to consuming the contents remaining in the vessel even when they are flat and of reduced quality.

Similar issues are presented by other comestible liquids and flowable substances. For instance, as soon as wine is exposed to air, the wine begins to oxidize. Wine, particularly fine wine, may desirably be aerated when initially opened, such as by decanting, to bring out the flavors and aroma of the liquid. Where the contents of a wine bottle are not entirely consumed, oxidation will continue, eventually leading to spoilage and loss.

A number of inventors have sought to provide multi-chamber beverage containers, often with the goal of permitting a selective mixing of multiple separate substances and sometimes with the goal of permitting access to a volume of flowable material in a first chamber while preserving a volume of material in a second chamber against exposure to ambient air until it is ready for consumption.

For example, with United States Patent Application Publication No. 2006/0254936, Corbitt et al. describe a "Beverage Container" with an open top selectively closed by a cap and two separate compartments in upper and lower sections of the bottle. The compartments are joined by a rotary coupler. Twisting the top and bottom sections in opposite direction is said to open a mixing valve in a mid-portion of the bottle. Opening the mixing valve permits the user to mix the liquids or other flowable materials in the two chambers. Disadvantageously, the disclosed mixing valve is relatively complex in structure and operation. Moreover, inadvertent relative twisting of the top and bottom sections will lead to a premature and undesirable mixing of the materials.

With the method and device disclosed in U.S. Pat. No. 5,909,824, entitled "Process and device for preserving carbonation of carbonated beverage during consumption," Qian et al. sought to preserve the carbonation of carbonated beverages. Under that invention, a user is expected to join an airtight closed container with a volume smaller than the beverage bottle with the beverage bottle through a connecting sleeve, an adapter, and a sealing mechanism. For the system to work in preventing a loss in carbonation within the bottle, the closed container must be joined with the bottle in an airtight manner so that a volume of beverage can be poured into the container without losing carbonation. Unfortunately, it would appear that misapplication of the device would lead to a loss in carbonation even more quickly than with a traditional beverage cap. Moreover, even assuming the method and device to be effective when perfectly applied, it is clear that use of the device requires some level of expertise and attention to detail. It is equally clear that the device is complicated structurally. Maintaining the components of the device together and in good working order would appear to represent a challenge even to the diligent user.

Still, further, in Brazilian Publication No. PI9802427-2, filed on 16 Jul. 1998, entitled "Valve for plastic bottles of carbonated soft drinks," an injected plastic valve is said to allow the withdrawal of liquid without a loss in gas. The structure has a lower body with a threaded connection to permit the valve to be fixed to the bottle. A buffer atop the structure serves as a button to permit the valve to be opened, and the valve closes by spring action on release of the button. Still further, an inner tube projects toward the bottom of the bottle to prevent gas from escaping and depressurizing the bottle. Opening the valve permits liquid to flow from the nozzle. Unfortunately, this device and devices like it require a foreign article to be inserted into the beverage, and they again require perfect application and operation for the system to prevent a wholesale loss of pressure and carbonation.

In view of the foregoing, it will be appreciated that the long felt need continues for an efficient and elegant system and method for reliably preserving the contents of beverage and other containers against loss of carbonation and spoliation. While a number of talented inventors have attempted to provide solutions, those solutions have proven to be complex, difficult to operate, or otherwise insufficient to meet the recognized needs in the field of beverage preservation.

SUMMARY OF THE INVENTION

Accordingly and in view of the recognized and continuing needs for preserving carbonated beverages, including sodas, beers, waters, juices, and other carbonated beverages, against excessive loss of carbonation and flavor and for preserving other beverages and flowable substances against spoiling, the present invention is founded on the basic object of providing a system and method for preserving the contents of beverage and other containers against loss of carbonation and spoilation in an efficient and elegant manner.

A further object of embodiments of the invention is to provide a system and method for preserving carbonated beverages and other substances that is simple and reliable in operation.

Another object of the invention in certain embodiments is to provide a system and method for preserving carbonated beverages and other substances that can enable ready access to a volume of beverage or other substance in a first or primary compartment while maintaining a volume of beverage or other substance in a substantially preserved condition in at least one secondary compartment whereby the volumes of substance can be enjoyed separately or in sequence with minimized loss in quality.

An underlying object of the invention is to provide a system and method for preserving carbonated beverages and other substances that increases consumer enjoyment of retained beverages and other substances.

A further underlying object of the invention is to provide a system and method for preserving carbonated beverages and other substances that reduces spoiling and waste of retained beverages and other substances.

Yet another object of the embodiments of the invention is to provide a system and method for preserving carbonated beverages and other substances that is adaptable for use in relation to a wide variety of container sizes and types.

An even further object of the invention is to provide a system and method for preserving carbonated beverages and other substances that can be manufactured and implemented in an inexpensive and practically viable manner.

These and further objects and advantages of the present invention will become obvious not only to one who reviews the present specification and drawings but also to those who have an opportunity to experience an embodiment of the system and method for preserving carbonated beverages and other substances disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth the aforementioned objects, one embodiment of the system and method for preserving carbonated beverages and other substances can be carried forth by a compartmented bottle with a compartmented bottle body having a primary compartment with an inner volume for retaining a primary volume of flowable material and at least one secondary compartment with an inner volume for retaining a secondary volume of flowable material. The primary compartment has an exhaust aperture, such as a threaded neck that can be selectively sealed by a correspondingly threaded cap, and an inlet aperture. The secondary compartment has a secondary exhaust aperture, and the inlet aperture of the primary compartment and the secondary exhaust aperture of the secondary compartment are fluidically connected, such as by an inter-compartmental conduit. A selectively actuated inter-compartmental valve is interposed between the inner volumes of the primary compartment and the at least one secondary compartment. The inter-compartmental valve has a closed condition wherein the inner volume of the secondary compartment is sealed from fluidic communication relative to the inner volume of the primary compartment, and the inter-compartmental valve has an open condition wherein the inner volume of the secondary compartment is in fluidic communication with the inner volume of the primary compartment.

Under this configuration, flowable material, such as a carbonated beverage, can be retained in the secondary compartment and sealed against a loss in carbonation, loss of flavor, spoilage, and other deleterious effects when the inter-compartmental valve is in a closed condition. The flowable material can be exhausted into the primary compartment and through the exhaust aperture when the inter-compartmental valve is in an open condition and the exhaust aperture of the primary compartment is open.

In certain embodiments of the compartmented bottle, the primary compartment can be substantially annular in lateral cross section, and the secondary compartment can be substantially annular in lateral cross section. Moreover, the primary compartment and the secondary compartment can be longitudinally aligned, and the primary and secondary compartments can narrow in proximity to the inlet aperture of the primary compartment and the secondary exhaust aperture of the secondary compartment. With that, an annular channel can be defined between the primary and secondary compartments. Where such a channel is presented, a toroidal collar can bridge the annular channel between the primary and secondary compartments. It is also possible for the inter-compartmental valve to have a valve handle retained at a distal end of an actuation rod that is drivingly engaged with the inter-compartmental valve, and an aperture in the toroidal collar can permit access to the handle of the inter-compartmental valve. Where the toroidal collar and the primary and secondary compartments correspond in outer diameter, a substantially continuous, cylindrical surface can be established by the primary and secondary compartments and the toroidal collar.

Embodiments of the compartmented bottle are contemplated wherein the inter-compartmental valve comprises a rotary valve. In certain manifestations of the invention, the inter-compartmental valve can take the form of a cylindrical valve with a cylindrical body having, for example, opposed apertures that can be selectively aligned to establish fluidic communication between the primary and secondary compartments. While other mechanisms are possible and within the general scope of the invention, the cylindrical valve could be manually operable by a handle fixed to a distal end of an actuation rod that is drivingly engaged with the cylindrical valve. In certain embodiments, the actuation rod can comprise an extension of the cylindrical body of the cylindrical valve.

Furthermore, where the primary compartment and the secondary compartment are substantially annular in lateral cross section and longitudinally aligned, the primary and secondary compartments can narrow in proximity to the inlet aperture of the primary compartment and the secondary exhaust aperture of the secondary compartment such that an annular channel is defined between the primary and secondary compartments. With that, a toroidal collar can bridge the annular channel between the primary and secondary compartments. Further, the toroidal collar could have an aperture therein that permits access to the handle of the inter-compartmental valve. Still further, it is contemplated that the actuation rod and the handle can extend to dispose the handle in a position generally corresponding to a radius of the toroidal collar.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

The system and method for preserving carbonated beverages and other substances disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures. Therefore, before any particular embodiment of the invention is explained in detail, it must be made clear that the following details of construction and illustrations of inventive concepts are mere examples of the many possible manifestations of the invention.

Figure 1:
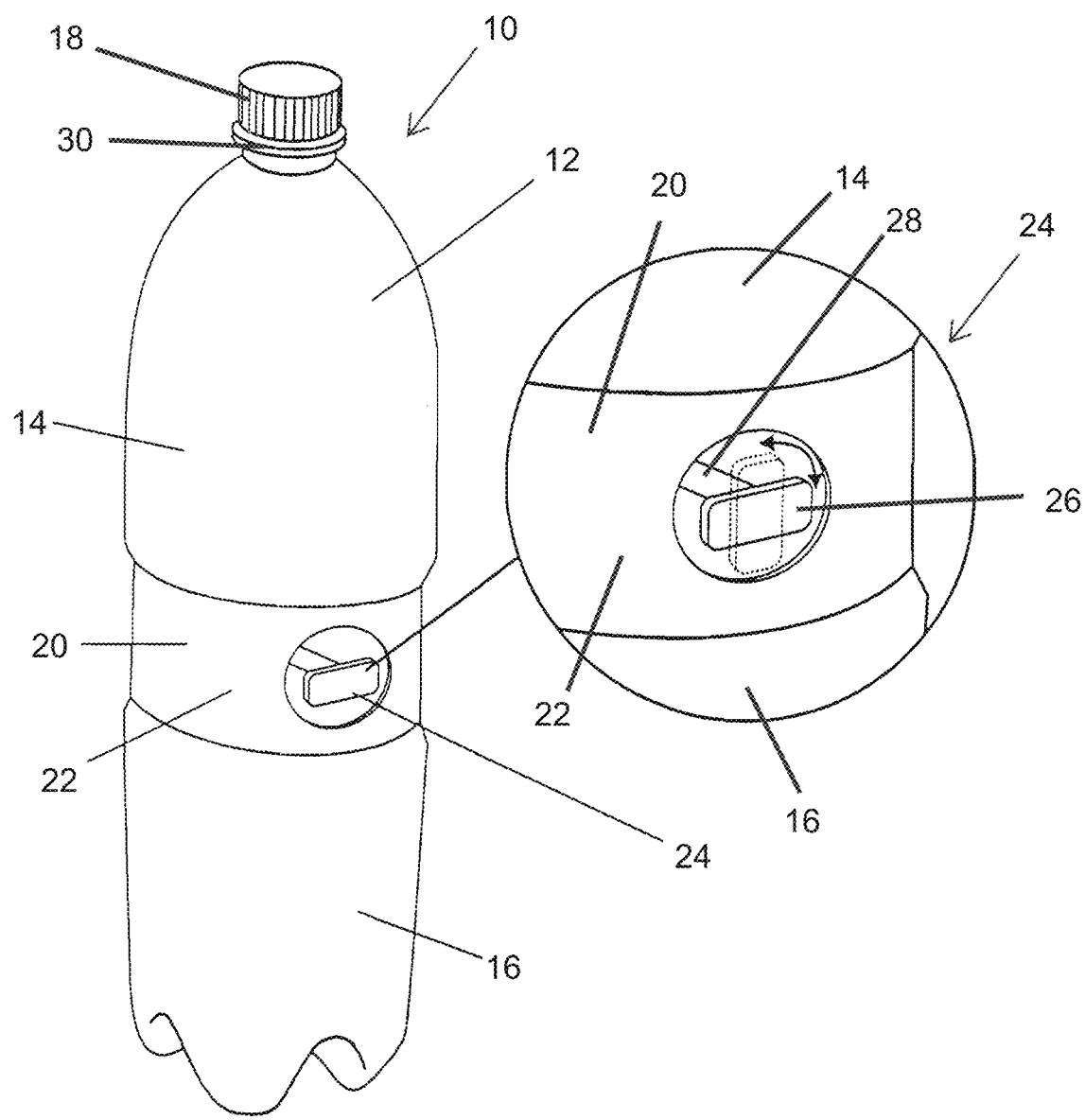
FIG. 1 is a perspective view of a beverage bottle incorporating a system for preserving carbonated beverages and other substances as disclosed herein with an inset, amplified view illustrating actuation of the compartment valve.
Figure 2:
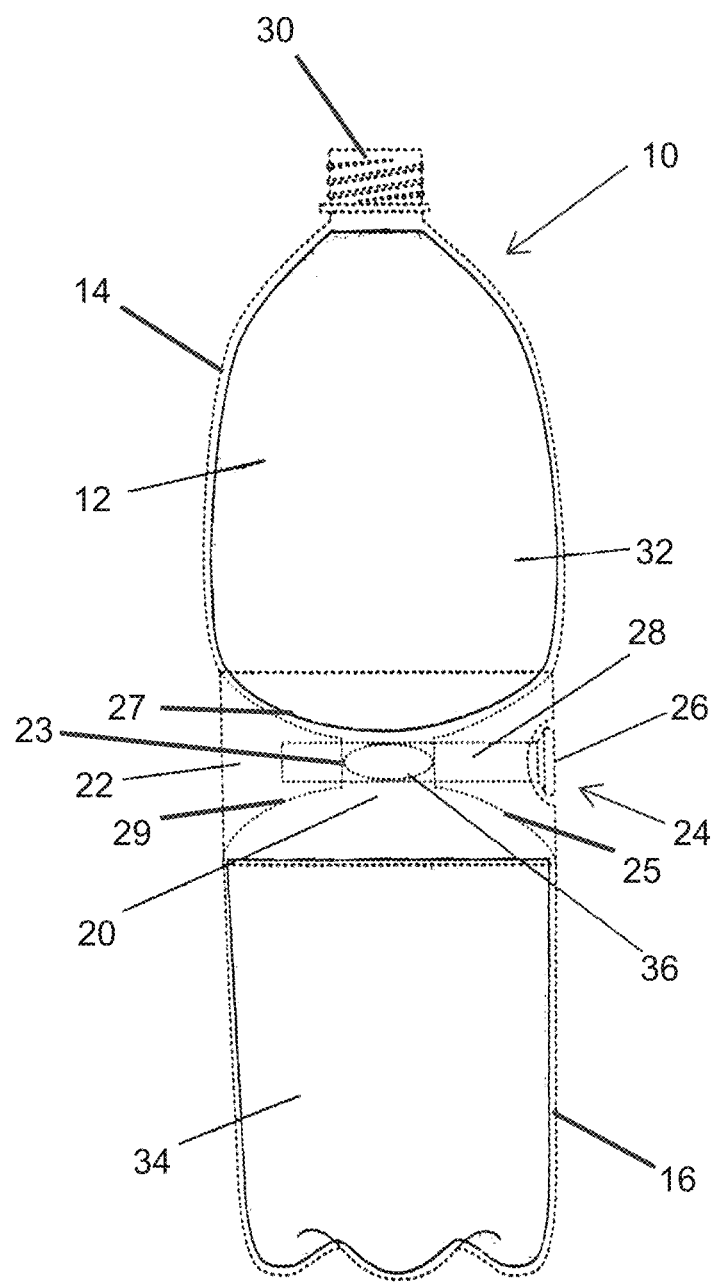
FIG. 2 is a view in side elevation of the beverage bottle of FIG. 1 with volumes of beverage retained in the first and second compartments thereof and with portions of the beverage bottle with the system for preserving carbonated beverages rendered transparent for clarity of illustration.
Figure 3:
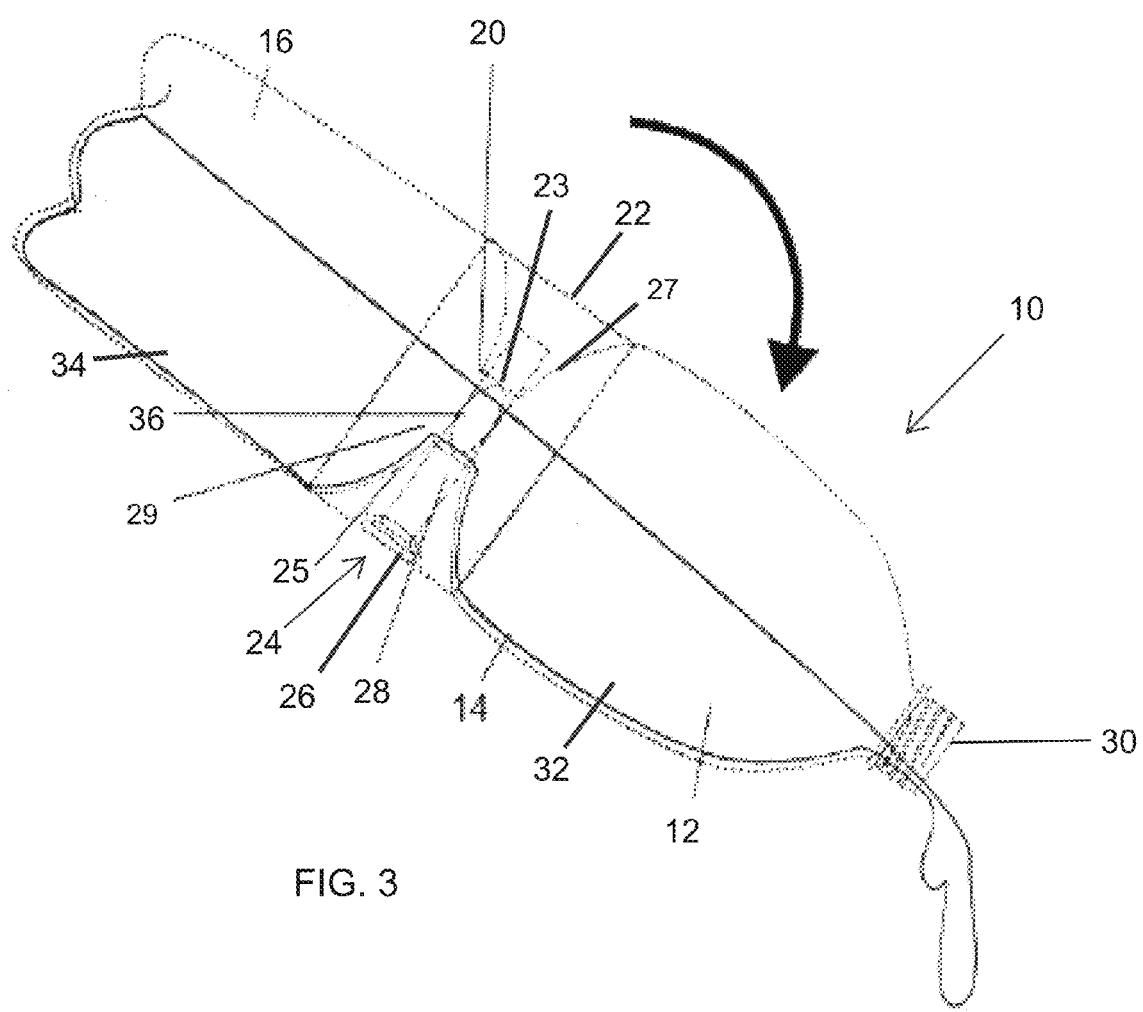
FIG. 3 is a view in side elevation of the beverage bottle of FIG. 1 during a dispensing of beverage from the first and second compartments with the compartment separation valve in an open condition.

Looking more particularly to the drawings, an embodiment of the invention disclosed herein is depicted in FIGS. 1 through 3 in the form of a compartmented bottle, which is indicated generally at 10. The illustrated compartmented bottle 10 can be employed to retain a variety of flowable, comestible substances or other substances that might be preserved against spoliation, loss of carbonation, or some other loss in freshness. The compartmented bottle 10 may at times be described as retaining carbonated beverages, such as sodas and beers, and may have advantageous application thereto. However, it will be understood that the compartmented bottle 10 may retain any flowable substance, including not only other beverages but also other comestible and non-comestible flowable substances whose freshness may be sought to be maintained.

In the present embodiment, the compartmented bottle 10 has a body 12 with first or primary compartment 14 and one secondary compartment 16 with it being understood that further similarly or differently constructed and/or disposed secondary compartments 16 could be provided. When the compartmented bottle 10 is in an upright configuration as shown in FIGS. 1 and 2, the primary compartment 14 comprises an upper compartment and the secondary compartment 16 comprises a lower compartment, and the compartments 14 and 16 may alternatively be referred to herein as such.

The upper compartment 14 has an open inner volume for retaining a primary volume of flowable material 32, such as a volume of carbonated beverage, and the lower compartment 16 has an open inner volume for retaining a secondary volume of flowable material 34, such as a carbonated beverage. The primary and secondary volumes of material can be the same or different. By way of example and not limitation, the primary and secondary volumes of material could be the same or different flavors of carbonated soda or some other beverage. Alternatively, the primary and secondary volumes of material could be different, such as by being complementary, and chosen for selective mixing. For instance, ingredients of a mixed beverage could be retained in the primary and secondary compartments for selective mixing by the user.

In the present embodiment of the broader invention disclosed herein, the primary compartment 14 pursues an oblong, rounded shape in longitudinal cross section and is substantially annular in lateral cross section. The upper portion of the primary compartment 14 narrows to an exhaust neck 30, which is threaded. A cap 18, which is also threaded, can be selectively employed to seal the open inner volume of the primary compartment 14 and any volume of material 32 retained therein relative to the environment. The lower portion of the primary compartment 14 narrows to an inlet aperture comprising a neck 27, which is open to an inter-compartmental conduit 23. The inter-compartmental conduit 23 in this example of the beverage bottle 10 comprises an abbreviated tube, which could be of any effective cross section, including but not limited to round, oval, rectangular, or some other cross section. The primary compartment 14 and the secondary compartment 16 are longitudinally aligned.

Also in the present embodiment, the secondary compartment 16 pursues an oblong shape in longitudinal cross section and is substantially annular in lateral cross section. The lower portion of the secondary compartment 16 presents a bottom configured to permit the compartmented bottle 10 to stand upright on a support surface (not shown). In the present example of the compartmented bottle 10, the bottom of the secondary compartment 16 is crenelated as is the case with many modern plastic beverage containers. The upper portion of the secondary compartment 16 narrows to a secondary exhaust aperture comprising a neck 29. The secondary exhaust neck 29 is open to the inter-compartmental conduit 23. Under this exemplary configuration, therefore, the open inner volumes of the primary and secondary compartments 14 and 16 are in fluidic communication through the inter-compartmental conduit 23. The necks 27 and 29 and the inter-compartmental conduit 23 establish a central connection section 20 that is fluidically sealed relative to the environment so that the open inner volumes are sealed from the environment when the cap 18 is engaged with the exhaust neck 30 of the primary compartment 14.

With the narrowing presented by the substantially annular lower portion of the primary compartment 14 and the substantially annular upper portion of the secondary compartment 16 meeting at the inter-compartmental conduit 23, an annular channel 25 is established between the primary and secondary compartments 14 and 16. A toroidal collar 22 bridges the annular channel 25 between the primary and secondary compartments 14 and 16. In this manifestation of the compartmented bottle 10, the exteriors of the toroidal collar 22 and the main body portions of the primary and secondary compartments 14 and 16 generally correspond in outer diameter. With that, a substantially continuous, cylindrical surface is established by the primary and secondary compartments 14 and 16 and the toroidal collar 22. The compartmented bottle 10 can thus approximate the shape of a traditional bottle, such as a two-liter bottle of soda or some other standard bottle shape.

Interposed between the inner volumes of the primary and secondary compartments 14 and 16 is a selectively actuated inter-compartmental valve 24. The valve 24 has a closed condition wherein the inner volume of the secondary compartment 16 and the material 34 therein are sealed from fluidic communication relative to the inner volume of the primary compartment 14 and the environment. The valve 24 has an open condition wherein the inner volume of the secondary compartment 16 and the material 34 therein are open to and in fluidic communication with the inner volume of the primary compartment 14 and, when the cap 18 is removed from the exhaust neck 30 of the primary compartment 14, with the environment. Therefore, when the valve 24 is in a closed condition, material 34 retained in the inner volume of the secondary compartment 16 can be preserved against losses in carbonation and flavor, spoilage, and other deleterious effects of exposure to the environment. However, when the valve 24 is in an open configuration as suggested, for example, in FIG. 3, material 34 in the inner volume of the secondary compartment 16 can be permitted to flow through the inter-compartmental conduit 23, into the inner volume of the primary compartment 14, and, when the cap 18 is removed, through the exhaust neck 30 to permit consumption thereof. Moreover, where the materials 32 and 34 are different, an opening of the valve 24 can permit a mixing thereof to the extent desired.

The type of valve 24 forming the inter-compartmental valve 24 could vary within the scope of the invention except as it might be expressly limited by the claims. In the depicted example of the invention, the inter-compartmental valve 24 is a rotary valve. The inter-compartmental valve 24 can, for example, be founded on a cylindrical valve 36 disposed in the inter-compartmental conduit 23 to seal the conduit 23 when in a closed condition and to permit fluidic communication between the primary and secondary compartments 14 and 16 when in an open condition. As is illustrated, the cylindrical valve 36 has a cylindrical body or cylindrical outer wall with at least one aperture therein for permitting selective fluidic communication across the inter-compartmental valve 24 depending on the rotational orientation of the valve 36. By combined reference to FIGS. 1 and 2, one can perceive that the cylindrical valve 36 can be manually operated by use of a paddle-shaped handle 26 that is fixed to a distal end of an actuation rod 28, which in turn is drivingly engaged with the cylindrical valve 36. Indeed, the actuation rod 28 can be an extension of the cylindrical valve 36 itself. Here, the actuation rod 28 and the handle 26 extend to dispose the handle 26 to a position generally corresponding to the radius of the toroidal collar 22, which has an annular aperture therein to permit actuation of the inter-compartmental valve 24 by a selective rotation of the handle 26 as suggested by the inset of FIG. 1. While the present inter-compartmental valve 24 may indeed be preferable for its effective performance and structural elegance, it will be understood that other types of valves could be employed within the scope of the invention.

One taking advantage of an embodiment of the invention can begin with a compartmented bottle 10 having volumes of material 32 and 34, such as a carbonated drink, in the open inner volumes of the first and second compartments 14 and 16. Where the materials 32 and 34 are beverages, the user can drink some or all of the beverage in the first, upper compartment 14 while the beverage material 34 in the second, lower compartment 16 is preserved against flavor loss, loss of carbonation, and spoilage. When appropriate, as show for example in FIG. 3, the valve 24 can be actuated to an open condition to permit a flow of liquid between the compartments 14 and 16 and from the second compartment 16 through the exhaust neck 30 of the compartmented beverage bottle 10 to permit consumption of the fresh beverage material 34 retained in the open inner volume of the second compartment 16. Meanwhile, at least in certain practices of the invention, the exterior of the bottle 10 can generally correspond in shape and overall configuration to that of a typical beverage bottle.

With certain details and embodiments of the present invention for a system and method for preserving carbonated beverages and other substances disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

I claim as deserving the protection of Letters Patent:

1. A compartmented bottle for preserving a volume of material in at least one secondary compartment, the compartmented bottle comprising:

a single-piece compartmented bottle body with a primary compartment with an inner volume for retaining a primary volume of flowable material and at least one secondary compartment with an inner volume for retaining a secondary volume of flowable material;

wherein the primary compartment has an exhaust aperture and an inlet aperture, wherein the secondary compartment has a secondary exhaust aperture, and wherein the inlet aperture of the primary compartment and the secondary exhaust aperture of the secondary compartment are fluidically connected by an inter-compartmental conduit;

wherein the primary compartment and the secondary compartment are longitudinally aligned and wherein the primary and secondary compartments narrow in proximity to the inlet aperture of the primary compartment and the secondary exhaust aperture of the secondary compartment such that an annular channel is defined between the primary and secondary compartments;

wherein the inter-compartmental conduit comprises a tube interposed between the inlet aperture of the primary compartment and the secondary exhaust aperture of the secondary compartment;

wherein the primary compartment, the secondary compartment, and the inter-compartmental conduit are unitarily formed as a single piece;

a selectively actuated inter-compartmental valve interposed between the inner volumes of the primary compartment and the at least one secondary compartment wherein the inter-compartmental valve is disposed at least partially within the inter-compartmental conduit, wherein the inter-compartmental valve has a closed condition wherein the inner volume of the secondary compartment is sealed from fluidic communication relative to the inner volume of the primary compartment, and wherein the inter-compartmental valve has an open condition wherein the inner volume of the secondary compartment is in fluidic communication with the inner volume of the primary compartment;

wherein the primary compartment is substantially annular in lateral cross section and wherein the secondary compartment is substantially annular in lateral cross section; and a toroidal collar wherein the toroidal collar bridges the annular channel between the primary and secondary compartments.

2. The compartmented bottle of claim 1 wherein the exhaust aperture of the primary compartment comprises an exhaust neck.

3. The compartmented bottle of claim 2 wherein the exhaust neck is threaded and further comprising a threaded cap for selectively sealing the exhaust neck.

4. The compartmented bottle of claim 1 wherein the inter-compartmental valve has a valve handle retained at a distal end of an actuation rod that is drivingly engaged with the inter-compartmental valve.

5. The compartmented bottle of claim 4 wherein the toroidal collar has an aperture therein that permits access to the handle of the inter-compartmental valve.

6. The compartmented bottle of claim 1 wherein the toroidal collar and the primary and secondary compartments correspond in outer diameter so that a substantially continuous, cylindrical surface is established by the primary and secondary compartments and the toroidal collar.

7. A compartmented bottle for preserving a volume of material in at least one secondary compartment, the compartmented bottle comprising:

a single-piece compartmented bottle body with a primary compartment with an inner volume for retaining a primary volume of flowable material and at least one secondary compartment with an inner volume for retaining a secondary volume of flowable material;

wherein the primary compartment has an exhaust aperture and an inlet aperture, wherein the secondary compartment has a secondary exhaust aperture, and wherein the inlet aperture of the primary compartment and the secondary exhaust aperture of the secondary compartment are fluidically connected by an inter-compartmental conduit;

wherein the primary compartment and the secondary compartment are longitudinally aligned and wherein the primary and secondary compartments narrow in proximity to the inlet aperture of the primary compartment and the secondary exhaust aperture of the secondary compartment such that an annular channel is defined between the primary and secondary compartments;

wherein the inter-compartmental conduit comprises a tube interposed between the inlet aperture of the primary compartment and the secondary exhaust aperture of the secondary compartment;

wherein the primary compartment, the secondary compartment, and the inter-compartmental conduit are unitarily formed as a single piece;

a selectively actuated inter-compartmental valve interposed between the inner volumes of the primary compartment and the at least one secondary compartment wherein the inter-compartmental valve is disposed at least partially within the inter-compartmental conduit, wherein the inter-compartmental valve has a closed condition wherein the inner volume of the secondary compartment is sealed from fluidic communication relative to the inner volume of the primary compartment, wherein the inter-compartmental valve has an open condition wherein the inner volume of the secondary compartment is in fluidic communication with the inner volume of the primary compartment, and wherein the inter-compartmental valve comprises a rotary valve.

8. The compartmented bottle of claim 7 wherein the inter-compartmental valve comprises a cylindrical valve disposed within the inter-compartmental conduit wherein the cylindrical valve has a cylindrical outer wall with at least one aperture therein for permitting selective fluidic communication across the inter-compartmental valve.

9. The compartmented bottle of claim 8 wherein the cylindrical valve is manually operable by a handle fixed to a distal end of an actuation rod that is drivingly engaged with the cylindrical valve.

10. A compartmented bottle for preserving a volume of material in at least one secondary compartment, the compartmented bottle comprising:

a single-piece compartmented bottle body with a primary compartment with an inner volume for retaining a primary volume of flowable material and at least one secondary compartment with an inner volume for retaining a secondary volume of flowable material;

wherein the primary compartment has an exhaust aperture and an inlet aperture, wherein the secondary compartment has a secondary exhaust aperture, and wherein the inlet aperture of the primary compartment and the secondary exhaust aperture of the secondary compartment are fluidically connected by an inter-compartmental conduit;

wherein the primary compartment and the secondary compartment are longitudinally aligned and wherein the primary and secondary compartments narrow in proximity to the inlet aperture of the primary compartment and the secondary exhaust aperture of the secondary compartment such that an annular channel is defined between the primary and secondary compartments;

wherein the inter-compartmental conduit comprises a tube interposed between the inlet aperture of the primary compartment and the secondary exhaust aperture of the secondary compartment;

wherein the primary compartment, the secondary compartment, and the inter-compartmental conduit are unitarily formed as a single piece, wherein the primary compartment is substantially annular in lateral cross section, and wherein the secondary compartment is substantially annular in lateral cross section;

a toroidal collar wherein the toroidal collar bridges the annular channel between the primary and secondary compartments;

a selectively actuated inter-compartmental valve interposed between the inner volumes of the primary compartment and the at least one secondary compartment wherein the inter-compartmental valve is disposed at least partially within the inter-compartmental conduit, wherein the inter-compartmental valve has a closed condition wherein the inner volume of the secondary compartment is sealed from fluidic communication relative to the inner volume of the primary compartment, wherein the inter-compartmental valve has an open condition wherein the inner volume of the secondary compartment is in fluidic communication with the inner volume of the primary compartment.

11. The compartmented bottle of claim 10 wherein the toroidal collar has an aperture therein that permits access to the handle of the inter-compartmental valve.

12. The compartmented bottle of claim 11 wherein the actuation rod and the handle extend to dispose the handle to a position generally corresponding to a radius of the toroidal collar.

* * * * *